United States Patent
Leforgeais et al.

(10) Patent No.: US 9,560,933 B2
(45) Date of Patent: Feb. 7, 2017

(54) BREWING DEVICE WITH CONTROL OF THE AMOUNT OF GROUNDS BY A FLOW METER AND COFFEE MAKER COMPRISING SUCH A DEVICE

(71) Applicant: SEB S.A., Ecully (FR)

(72) Inventors: Michel Leforgeais, Fontenay le Pesnel (FR); Thomas Leterrier, Saint Lo (FR); Frederic Hiron, Saint Ouen de Mimbre (FR); Patrick Deliens, Mayenne (FR); Ronan Le Goueff, Laval (FR)

(73) Assignee: SEB S.A., Ecully (FR)

( * ) Notice: Subject to any disclaimer, the term of this patent is extended or adjusted under 35 U.S.C. 154(b) by 495 days.

(21) Appl. No.: 14/095,275

(22) Filed: Dec. 3, 2013

(65) Prior Publication Data

US 2014/0150663 A1   Jun. 5, 2014

(30) Foreign Application Priority Data

Dec. 3, 2012 (FR) ..................................... 12 61571

(51) Int. Cl.
  *A47J 31/56* (2006.01)
  *A47J 31/44* (2006.01)
  *A47J 31/36* (2006.01)

(52) U.S. Cl.
  CPC ............. *A47J 31/56* (2013.01); *A47J 31/3614* (2013.01); *A47J 31/4403* (2013.01)

(58) Field of Classification Search
  CPC ..... A47J 31/3614; A47J 31/4403; A47J 31/56

USPC .......................................................... 99/283
  See application file for complete search history.

(56) References Cited

U.S. PATENT DOCUMENTS

| 5,495,793 | A | * | 3/1996 | Muis ................. A47J 31/34 99/280 |
| 6,205,909 | B1 | * | 3/2001 | Giannelli ............ A47J 31/3614 99/287 |
| 8,442,674 | B2 | * | 5/2013 | Tilton .................. G07F 13/065 700/232 |
| 2011/0189362 | A1 | * | 8/2011 | Denisart ................. A47J 31/22 426/433 |
| 2011/0297002 | A1 | | 12/2011 | Vitel et al. |

FOREIGN PATENT DOCUMENTS

EP     0627186 A1   12/1994
EP     2394541 A1   12/2011

* cited by examiner

*Primary Examiner* — David Angwin
*Assistant Examiner* — Amit K Singh
(74) *Attorney, Agent, or Firm* — The Webb Law Firm

(57) ABSTRACT

Provided is a brewing device for an espresso maker having a brewing chamber for receiving grounds, a pressing ram mounted movably on a path of travel extending between a top position and a bottom compaction position in which it penetrates into said brewing chamber to form a cake of compacted grounds, a hydraulic drive mechanism for the pressing ram having a hydraulic pump and means for measuring the volume of hydraulic fluid injected into the drive mechanism. The brewing device has a control circuit that determines the height of the cake of compacted grounds from signals delivered by the volume measurement means during the travel of the pressing ram.

12 Claims, 3 Drawing Sheets

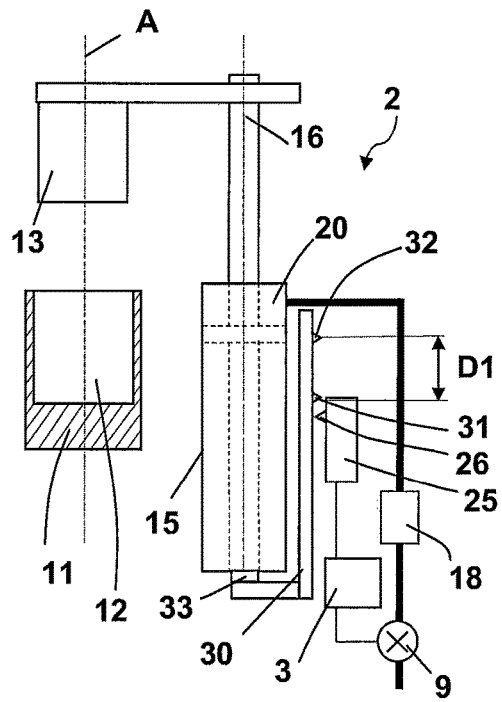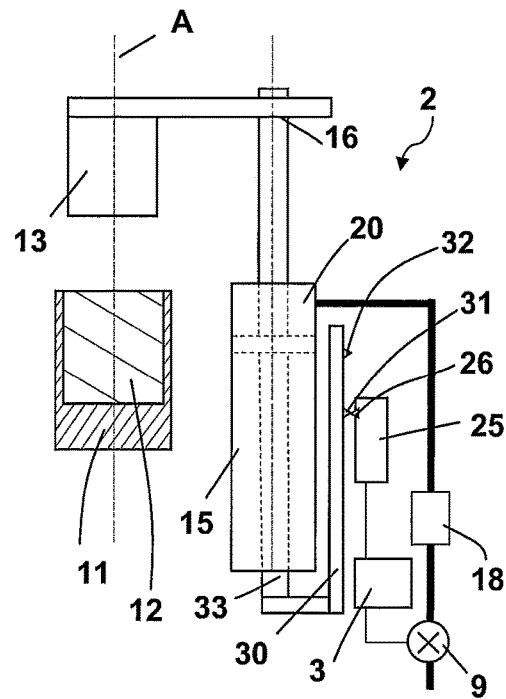
Fig.3          Fig.4
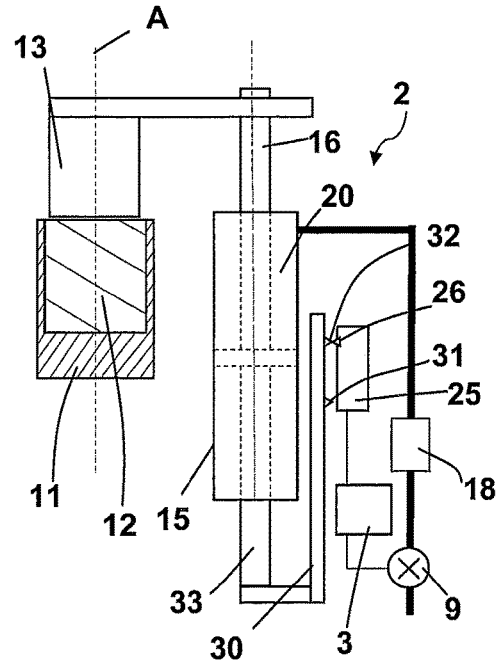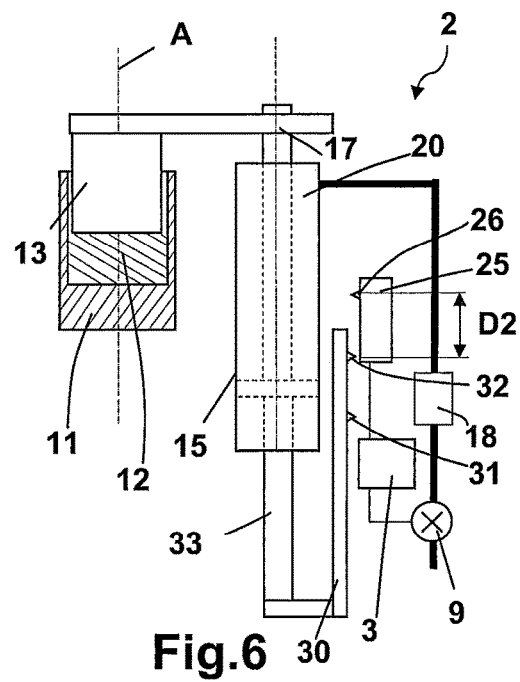
Fig.5          Fig.6

BREWING DEVICE WITH CONTROL OF THE AMOUNT OF GROUNDS BY A FLOW METER AND COFFEE MAKER COMPRISING SUCH A DEVICE

CROSS-REFERENCE TO RELATED APPLICATION

This application claims priority to French Patent Application No. 1261571 filed Dec. 3, 2012.

BACKGROUND OF THE INVENTION

Field of the Invention

The present invention relates to a brewing device for an espresso maker, in particular a brewing device in which an amount of grounds introduced into a brewing chamber is controlled during each cycle in order to guarantee a repeatable result for a selected beverage type.

Description of Related Art

The amount of grounds to introduce into the brewing chamber can be alterable in order to obtain different beverages, specifically strong coffee known as ristretto, espresso, lungo, etc.

The brewing device of a coffee maker typically has a brewing chamber, which is supplied with grounds, and a pressing ram, which compresses the grounds in the brewing chamber into a cake. The grounds are generally produced by a coffee grinder equipped with grinding wheels, one of which is driven in rotation. The amount of grounds delivered corresponds to a grinding wheel drive time stored in a control circuit. However, several parameters, specifically the wear of the grinding wheels or the hardness of the coffee beans, can cause the amount of grounds delivered to vary even with the same grinding wheel drive time.

For measuring this variation, adding a device for measuring the thickness of the cake of compressed grounds, which is representative of the amount of grounds introduced into the brewing chamber, is known to the prior art. The thickness of the cake of grounds is calculated from the measurement of the compaction position of the pressing ram in the brewing chamber.

An appliance for preparing beverages having a brewing device comprising a brewing chamber which receives the grounds and a pressing rain which is axially displaced by an electric motor from a waiting position outside the chamber to a compaction position inside the chamber is thus known from document EP0627186. A sensor associated with a control device is used to calculate the compaction position of the rain in the chamber by counting the number of revolutions of the motor. The sensor can be a Hall effect sensor associated with several magnets driven in rotation or an optical sensor associated with a slotted disc driven in rotation by the motor. The compaction position of the rain can then be compared to a predetermined value, a deviation between these two values indicating the presence of too small or too large an amount of grounds in the chamber.

In this construction, however, the sensors and the associated movable elements are expensive and complicated and are a potential source of breakdowns. An optical sensor in particular is sensitive to fouling in the environment of an espresso maker.

Also known from document EP2394541 is a brewing device for an espresso maker having a brewing chamber for receiving grounds, a pressing ram mounted movably in translation along a path of travel extending between a top retracted position in which it is situated above the brewing chamber and a bottom compaction position in which it penetrates the brewing chamber to form a cake of compacted grounds, wherein the pressing ram is driven by a hydraulic drive mechanism with a hydraulic cylinder and a pump. The device has a rotary potentiometer controlled by drive means during the travel of the pressing ram, making it possible to measure the compaction position of the pressing rain and deduce the height of a cake of compacted grounds therefrom.

This document discloses a device for driving the pressing rain that is economical insofar as the pump supplying the hydraulic cylinder is necessary for the injection of hot water under pressure into the brewing chamber for making coffee. For measuring the height of the compacted cake of grounds, however, the potentiometer is an expensive and bulky component that is hard to fit in the brewing device.

The object of the present invention is to remedy the aforementioned disadvantages and to propose a brewing device enabling precise control of the amount of grounds introduced into a brewing chamber that is simple in design and inexpensive to implement.

Another object of the present invention is to propose a brewing device that operates in a reliable manner.

SUMMARY OF THE INVENTION

Another object of the present invention is to propose an espresso maker with a brewing device of the aforementioned type.

These objects are achieved with a brewing device for an espresso maker having a brewing chamber for receiving grounds, a pressing rain mounted movably on a path of travel extending between a top position and a bottom compaction position in which it penetrates into said brewing chamber to form a cake of compacted grounds, a hydraulic drive mechanism for the pressing rain with a hydraulic pump and means of measuring the volume of hydraulic fluid injected into the drive mechanism, characterized in that the brewing device has a control circuit that determines the height of the cake of compacted grounds from signals delivered by the volume measurement means during the travel of the pressing rain.

The number of signals emitted by the volume measurement means is proportional to the amount of hydraulic fluid (e.g., water) injected by the pump into the drive mechanism (e.g., a cylinder) of the pressing rain in order to move it from the top position into the bottom compaction position. The amount of water injected into the cylinder is proportional to the travel of the pressing ram. The control circuit can therefore determine the travel of the pressing ram from the number of signals emitted by the volume measurement means and deduce the height of the compacted cake of grounds therefrom.

The hydraulic pump advantageously supplies the brewing chamber with water and the control circuit advantageously determines the amount of water injected, which is representative of the volume of the beverage to prepare, from the signals delivered by the volume measurement means.

This arrangement makes it possible to execute two different functions with the hydraulic pump and the volume measurement means: a first function that consists of making a beverage by injecting and metering hot water and a second function that consists of compacting and measuring a cake of grounds. A particularly economical brewing device is thus obtained.

Preference is given to the volume measuring means having a flow meter.

The flow meter is a particularly economical solution for measuring a volume of fluid injected by the hydraulic pump.

The brewing device advantageously has a device for calibrating the flow meter relative to a portion of the path of travel of the pressing rain.

The number of signals emitted by the flow meter is counted on a portion of the path of travel of the pressing ram. The flow meter can thus be calibrated by determining the elementary path traveled in millimeters by the pressing ram for each signal emitted by the flow meter.

This arrangement thus makes it possible to select a standard, commercially available flow meter without a particular range of precision. This component is thus very economical.

The calibration device advantageously has a switch and a ruler that is movable with the pressing ram, the ruler being equipped with two projections cooperating with the switch, the distance between the two projections corresponding to the portion of the path of travel of the pressing rain.

This arrangement enables the control circuit to determine two specific displacement points of the pressing rain by using two electric signals generated by the switch during the passage of the projections. These two points characterize a known portion of the path of travel of the pressing rain equal to the distance between the two projections.

A device for calibrating the flow meter is thus produced from simple and inexpensive components.

The measured portion of the path of travel is advantageously larger than a third of the path of travel of the pressing rain.

The measured portion of the path of travel is preferably larger than half of the path of travel of the pressing rain.

These arrangements make it possible to obtain a very precise calibration of the flow meter.

The switch is advantageously water-tight.

This arrangement makes it possible to achieve a reliable operation of the switch over time in spite of a humid environment contaminated with coffee grounds residues.

The hydraulic drive mechanism of the pressing ram advantageously has a hydraulic cylinder.

This arrangement makes it possible to produce a hydraulic drive mechanism from a simple and inexpensive component.

BRIEF DESCRIPTION OF THE DRAWINGS

The invention also relates to an espresso maker having a brewing device as described above.

The invention will be more clearly understood by studying the embodiment illustrated in the appended figures, which is in no way limiting. Shown are:

FIG. 3 illustrates a schematic view of the brewing device illustrated in FIG. 2;

FIG. 4 illustrates a schematic view of the brewing device illustrated in FIG. 2 with the first projection of the ruler actuating the switch; and FIG. 5 illustrates a schematic view of the brewing device illustrated in FIG. 2 with the second projection of the ruler actuating the switch;

FIG. 6 illustrates a schematic view of the brewing device illustrated in FIG. 2 with the pressing rain illustrated in the compaction position.

DESCRIPTION OF THE INVENTION

Figure 1:
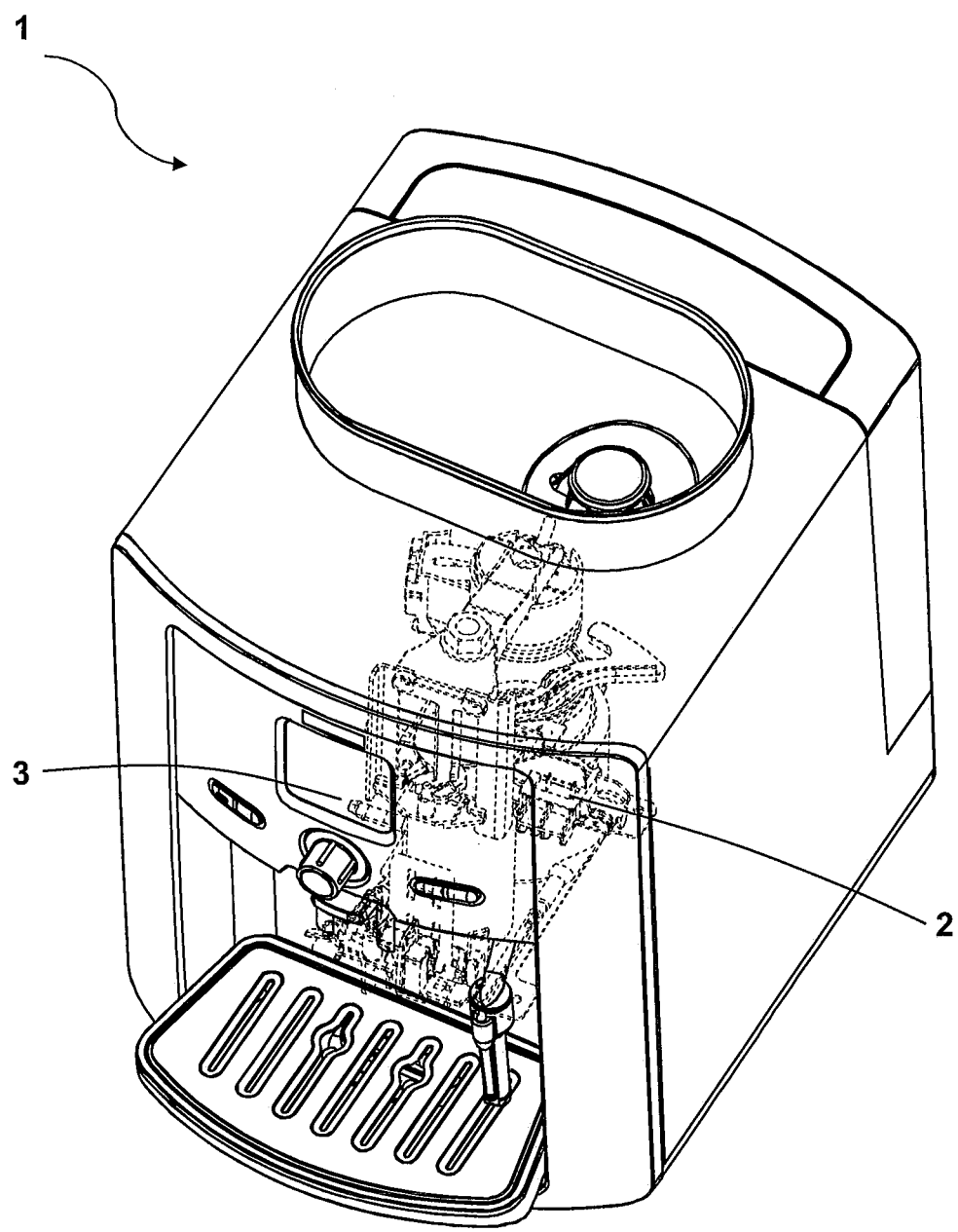
FIG. 1 illustrates a perspective view of an espresso maker incorporating a brewing device according to a particular embodiment of the invention.
Figure 2:
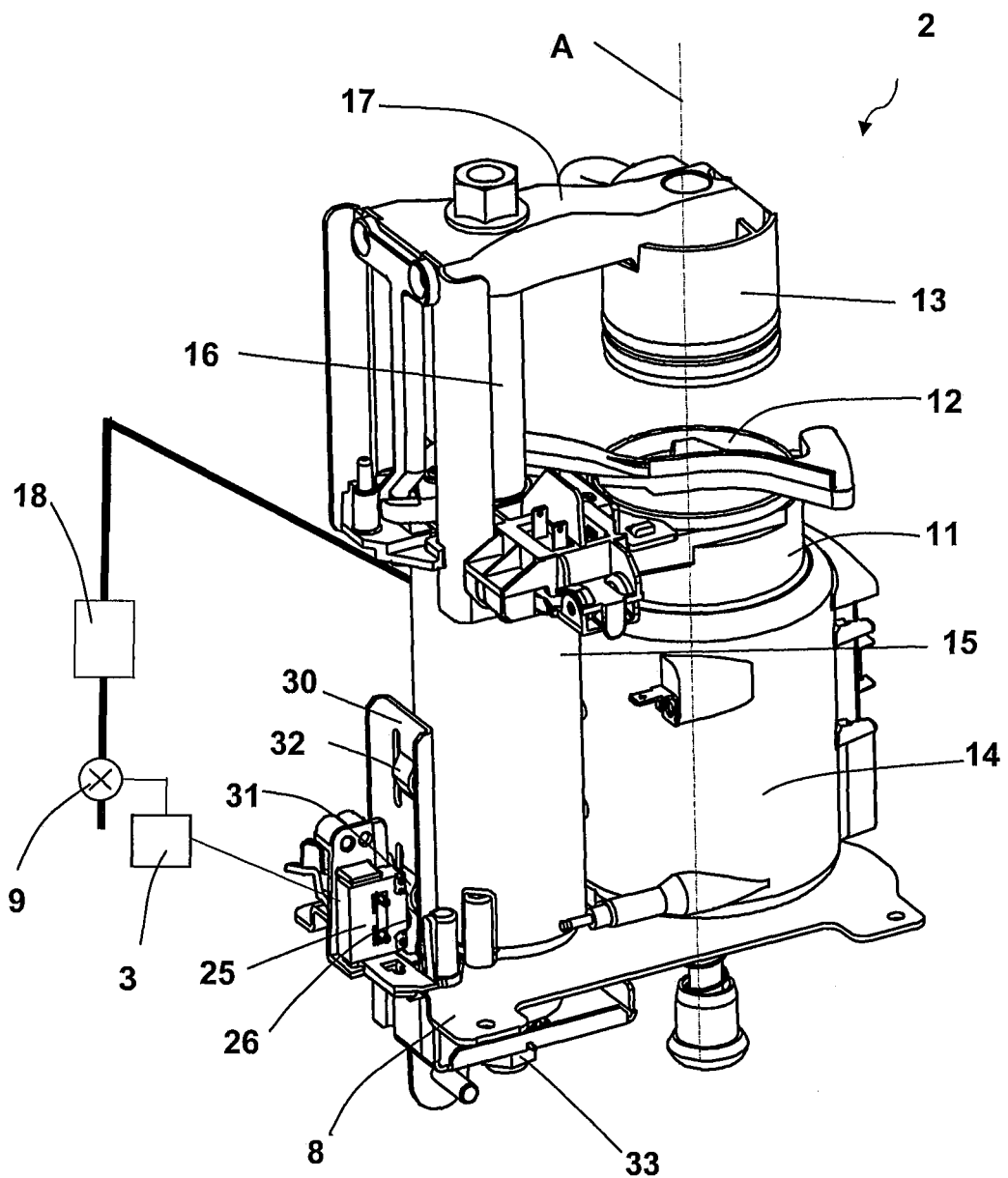
FIG. 2 illustrates a perspective view of the brewing device of FIG. 1 in which the pressing ram is shown in the retracted position, with the hydraulic pump, the flow meter, and the control circuit shown schematically.

In the example of embodiment illustrated in FIG. 1, a brewing device 2 equips an automatic coffee maker 1 comprising a cold water supply, a dispenser of powdered coffee coming from a coffee grinder built into the dispenser (which are not shown in the figures), and a control circuit 3 for commanding and controlling the cycles of preparation of brewed beverages, the control circuit 3 specifically controlling the brewing device 2.

Such a brewing device 2, which is illustrated in FIGS. 2 through 6, specifically comprises a body 11 with a vertical lengthwise axis containing a brewing chamber 12 for receiving a pressing ram 13 mounted displaceably along the axis A by means of a hydraulic drive mechanism, a hydraulic pump 18 for creating a water and brewing circulation, and also a boiler 14 for heating the water for preparing the brew in the brewing chamber 12. According to a particular but non-limiting feature of the invention, the hydraulic drive mechanism has a single action hydraulic cylinder 15 with an upper shaft 16 bearing an arm 17 forming a bracket and of which the free end is connected to the pressing rain 13. The hydraulic cylinder 15 is arranged laterally to the body 11 on a base 8, thus the travels of the pressing rain 13 and of the hydraulic cylinder 15 are executed in essentially parallel directions. The pressing ram 13 travels a path between a top retracted position, in which it is located above the brewing chamber 12, and a bottom compaction position, in which it penetrates the brewing chamber 12. In the bottom compaction position, the pressing ram 13 compresses the grounds admitted into the brewing chamber 12 to form a cake of compressed grounds.

The boiler 14 and the body 11 are formed as a single piece of heat conducting material that contains a heating electrical resistor and channels for the passage and heating of water, with inlets connected via the hydraulic pump 18 to a cold water tank and with ends opening on the bottom of the brewing chamber 12. The pressing rain 13 has a brew conduit opening through an outlet hole, whereas the hydraulic pump 18 is designed to create a circulation of water in the brewing chamber 12 that ascends to the conduit as the pressing ram 13 closes the chamber. A flow meter 9 is arranged in the hydraulic circuit for measuring the amount of water injected into the brewing chamber 12 and thus providing the volume of the specified beverage. The flow meter 9 sends signals to the control circuit 3. Such a brewing device 2 has, for example, been described in more detail in patent application WO99/12456.

The signals delivered by the flow meter 9 advantageously enable the control circuit 3 to determine the height of the compacted cake of grounds during the displacement of the pressing ram. The flow meter 9 generates a square signal formed by a rising edge and a falling edge characterizing the passage of an elementary volume of hydraulic fluid, in our case water. A square signal can be called a "pulse". The injection of an elementary volume of water into a chamber 20 of the hydraulic cylinder 15 induces the downward displacement of the upper shaft 16 and of the pressing rain 13 by an elementary distance defining the sensitivity of the flow meter in millimeters per pulse. The flow meter can be a flow meter with a Hall effect sensor and a mobile paddle-wheel equipped with magnets.

The brewing device advantageously has a device for calibrating the flow meter 9, which enables the control circuit 3 to recalculate the sensitivity of the flow meter with each cycle. The calibration device comprises a switch 25 and ruler 30 rigidly connected to the pressing rain 13. The switch 25 can be, for example, a micro-switch selected in a water-tight version and comprising a push button 26. The switch 25 is arranged on the base 8. In the embodiment illustrated in FIGS. 2 through 6, the ruler is arranged parallel to the direction of travel of the pressing rain 13. The ruler 30 is rigidly connected to a lower shaft 33 of the hydraulic cylinder 15. The ruler 30 has a first projection 31 and a second projection 32 positioned in the direction of travel of the pressing ram 13 and separated from one another by a distance D1 (FIG. 3). The first projection 31 and the second projection 32 cooperate with the push button 26 of the switch 25 during the travel of the pressing rain 13. The pressing of a projection 31, 32 on the push button 26 generates an electric signal from the switch 25, which is recorded by the control circuit 3.

The brewing chamber 12 can have a stop on which the pressing rain comes in abutment so as not to go beyond the minimum thickness.

In operation, upon first use, the user selects and initiates the preparation of a beverage with the help of the control circuit 3. A grinding time for producing a cake of compressed grounds of a theoretical height for the selected beverage is stored. The control circuit 3 will regulate the grinder in order to supply the brewing chamber 12 with the predefined amount of grounds. Once the grinding time has expired, the hydraulic pump 18 supplies the hydraulic cylinder 15, which drives the pressing rain 13 and the ruler 30 from the top position illustrated in FIGS. 2 and 3 into the bottom position illustrated in FIG. 6.

In a preferred but non-limiting manner, the control circuit 3 determines the height of the cake of grounds by carrying out the following steps:

The first step consists of calibrating the flow meter 9 by calculating its sensitivity S1: The first projection 31 presses the push button 26 (FIG. 4), which generates an electrical signal recorded by the control circuit 3, which starts the counting of the square signals emitted by the flow meter 9. The pressing rain 13 and the ruler 30 continue to move, the first projection 31 releases the push button 26 and then the second projection 32 presses the push button 26 (FIG. 5) again, which generates an electrical signal recorded by the control circuit 3, which then stores the sum P1 of the square signals emitted by the flow meter 9 on the path of travel equal to the distance between the projections 31, 32. The control circuit 3 then calculates the sensitivity S1 of the flow meter, which is equal to the distance D1 between the projections 31, 32 divided by P1: $S1=D1/P1$.

The second step consists of determining a distance D2 (FIG. 6) traveled by the pressing rain between the signal emitted by the switch 25 when held by the second projection 32 and the bottom compaction position: upon receiving the signal emitted by the switch 25 when the push button 26 is held by the second projection 32, the control circuit 3 initiates a counting of the square signals emitted by the flow meter 9 until the stopping of the pressing ram 13 in the bottom compaction position (FIG. 6). When the compaction position is reached, the hydraulic pump cannot inject any more water into the chamber of the cylinder 15, the flow is zero, and the flow meter no longer generates signals. The sum P2 of the square signals emitted by the flow meter 9 enables the control circuit 3 to determine a distance D2 traveled by the pressing ram between the signal emitted by the switch 25 when held by the second projection 32 and the bottom compaction position: $D2=P2 \times S1$.

The third step consists of determining the height Hr of the compacted cake of grounds: stored in the control circuit is a distance DR corresponding to the movement of the pressing rain 13 from the signal emitted by the switch 25 when the push button 26 is held by the first projection 31 until a stop position at the bottom of the brewing chamber 12, this position being reached in the absence of grounds. From this distance DR, the control circuit 3 calculates the height Hr of the compacted cake of grounds:

$$Hr=DR-D2-D1.$$

The control circuit 3 stores the height Hr of the compacted cake of grounds.

Once the operations of preparing and dispensing the beverage are completed, the control circuit 3 commands the hydraulic cylinder 15 to return from the bottom compaction position to the top position.

As an example, the distance DR is equal to 55 millimeters. The distance D1 between the first projection 31 and the second projection 32 is 30 millimeters. The flow meter generates, for example, the sum P1 of 100 square signals or pulses over the distance D1. The sensitivity $S1=D1/P1$ of the flow meter is 0.3 millimeters per pulse.

Assuming, for example, that the control circuit 3 counts a sum P2 of square signals emitted by the flow meter equal to 40 pulses, the calculated distance D2 will equal: $D2=P2 \times S1=40 \times 0.3=12$ millimeters.

From this the control circuit can then deduce the height Hr of the compacted cake of grounds=$DR-D2-D1=55-30-12=13$ millimeters.

The storage of the height Hr of the compacted cake of grounds will enable the control circuit 3 to calculate, for the next cycle of preparation of the same beverage, a grinding time corrected by a coefficient K obtained from, for example, the ratio of the theoretical height of the compacted cake of grounds and the height Hr. The corrected grinding time can be obtained from a more complex calculation that takes several actual heights Hr of previous cycles into account.

The invention is obviously not limited in any way to the embodiment described and illustrated herein, which was presented solely as an example. Modifications are still possible, particularly in terms of the constitution of diverse elements or by substituting equivalent techniques, without exceeding the scope of protection of the invention in any way.

In an alternate embodiment, the switch 25 is movably mounted on the shaft 33 of the hydraulic cylinder 15 and the ruler 30 is fix-mounted on the base 8.

The invention claimed is:

1. A brewing device for an espresso maker having a brewing chamber for receiving grounds, a pressing ram mounted movably along a path of travel extending between a top position and a bottom compaction position in which it penetrates into said brewing chamber to form a cake of compacted grounds, a hydraulic drive mechanism for the pressing ram having a hydraulic pump and means for measuring the volume of hydraulic fluid injected into the drive mechanism, wherein the brewing device has a control circuit which determines the height of the cake of compacted grounds from signals delivered by the volume measurement means during the travel of the pressing ram, and wherein the volume measurement means has a flow meter and the brewing device comprises a calibrating device for calibrating the flow meter in relation to a portion of the path of travel of the pressing ram, and wherein the calibration device has a switch and a ruler displaceable with the pressing ram in which the ruler is equipped with two projections cooperating with the switch, the distance between the two projections corresponding to the portion of the path of travel of the pressing ram.

2. The brewing device as in claim 1, wherein the hydraulic pump supplies the brewing chamber with water and the control circuit determines the amount of water injected, which is representative of the volume of the beverage to prepare, from signals delivered by the volume measurement means.

3. The brewing device as in claim 1, wherein the measured portion of the path of travel is larger than one third of the path of travel of the pressing ram.

4. The brewing device as in claim 1, wherein the measured portion of the path of travel is larger than half of the path of travel of the pressing ram.

5. The brewing device as in claim 1, wherein the switch is water-tight.

6. The brewing device as in claim 1, wherein the hydraulic drive mechanism of the pressing ram has a hydraulic cylinder.

7. An espresso maker having a brewing device according to claim 1.

8. An espresso maker having a brewing device according to claim 2.

9. An espresso maker having a brewing device according to claim 3.

10. An espresso maker having a brewing device according to claim 4.

11. An espresso maker having a brewing device according to claim 5.

12. An espresso maker having a brewing device according to claim 6.

* * * * *